United States Patent
Cannon et al.

(10) Patent No.: US 11,620,334 B2
(45) Date of Patent: Apr. 4, 2023

(54) COMMERCIAL VIDEO SUMMARIES USING CROWD ANNOTATION

(71) Applicant: International Business Machines Corporation, Armonk, NY (US)

(72) Inventors: Gray Cannon, Miami, FL (US); Aaron K. Baughman, Cary, NC (US); Marco Aurelio Stelmar Netto, Sao Paulo (BR); Vagner Figueredo de Santana, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 16/686,288

(22) Filed: Nov. 18, 2019

(65) Prior Publication Data

US 2021/0149955 A1    May 20, 2021

(51) Int. Cl.

| | |
|---|---|
| *G06F 16/738* | (2019.01) |
| *G06N 3/04* | (2023.01) |
| *H04N 21/8549* | (2011.01) |
| *G06F 16/75* | (2019.01) |
| *G06F 40/169* | (2020.01) |

(52) U.S. Cl.
CPC ............ *G06F 16/739* (2019.01); *G06F 16/75* (2019.01); *G06F 40/169* (2020.01); *G06N 3/04* (2013.01); *H04N 21/8549* (2013.01)

(58) Field of Classification Search
None
See application file for complete search history.

(56) References Cited

U.S. PATENT DOCUMENTS

| | | | |
|---|---|---|---|
| 6,182,069 B1 | 1/2001 | Niblack | |
| 6,585,521 B1 | 7/2003 | Obrador | |
| 7,801,885 B1 | 9/2010 | Verma | |
| 7,853,622 B1 | 12/2010 | Baluja | |
| 7,904,924 B1 | 3/2011 | de Heer | |
| 8,220,022 B1 | 7/2012 | Pan | |
| 8,713,618 B1 | 4/2014 | Kuznetsov | |
| 9,684,432 B2 | 6/2017 | Fink | |
| 9,852,646 B2 | 12/2017 | Kozloski et al. | |
| 10,268,897 B2 | 4/2019 | Cunico | |
| 2008/0046925 A1 | 2/2008 | Lee | |
| 2013/0004138 A1 | 1/2013 | Kilar | |
| 2013/0283301 A1 | 10/2013 | Avedissian | |
| 2014/0101551 A1 | 4/2014 | Sherrets et al. | |
| 2014/0152847 A1 | 6/2014 | Zomet et al. | |
| 2014/0215512 A1 | 7/2014 | Maruyama | |
| 2014/0337126 A1* | 11/2014 | Ohanyan | G06Q 30/0251 705/14.49 |

(Continued)

FOREIGN PATENT DOCUMENTS

CN    104618806 A    5/2015

OTHER PUBLICATIONS

Sahoo Anurag. Apr. 2017. A Unified Multi-Faceted Video Summarization System.*

(Continued)

*Primary Examiner* — Tuankhanh D Phan
(74) *Attorney, Agent, or Firm* — Isaac J. Gooshaw; Heather Johnston

(57) ABSTRACT

A system for executing a video summary is provided. One or more video segments for a video based on one or more digital media is generated. A video summary is generated based on a user request.

20 Claims, 7 Drawing Sheets

(56) References Cited

U.S. PATENT DOCUMENTS

| | | |
|---|---|---|
| 2016/0006944 A1 | 1/2016 | Voss |
| 2016/0006946 A1 | 1/2016 | Cohen et al. |
| 2017/0201478 A1 | 7/2017 | Joyce et al. |
| 2017/0243485 A1* | 8/2017 | Rubin .................. H04W 72/30 |
| 2018/0124142 A1* | 5/2018 | Gonzalez ........... H04N 21/8456 |
| 2018/0204111 A1* | 7/2018 | Zadeh ................. G06N 3/0436 |

OTHER PUBLICATIONS

Disclosed Anonymously, "Collaborative Video Tagging and Aggregation," IP.com Prior Art Database Technical Disclosure, IP.com No. IPCOM000215520D, Publication Date: Mar. 6, 2012, 3 pages.

Keen et al., "Cognitively Derived Multimedia Streaming Preferences", U.S. Appl. No. 16/025,015, filed Apr. 1, 2019, 38 pages.

Madden et al., "A classification scheme for content analyses of YouTube video comments," Journal of Documentation, 69(5), 2013, pp. 693-714, <https://strathprints.strath.ac.uk/42033/>.

Marrese-Taylor et al., "Mining fine-grained opinions on closed captions of YouTube videos with an attention—RNN," arXiv:1708.02420v1 [cs.CL] Aug. 8, 2017, 10 pages.

Siersdorfer et al., "How Useful are Your Comments? Analyzing and Predicting YouTube Comments and Comment Ratings," WWW 2010, Apr. 26-30, 2010, Raleigh, North Carolina, pp. 891-900.

Well et al., "The NIST Definition of Cloud Computing", NIST, U.S. Department of Commerce, Special Publication 800-145, Sep. 2011, 7 pages.

* cited by examiner

COMMERCIAL VIDEO SUMMARIES USING CROWD ANNOTATION

BACKGROUND OF THE INVENTION

The present invention relates generally to the field of video-sharing, and more particularly to video annotation.

In recent years, the growth of marketing for commercial products and services has increased. Additionally, the presence of online marketing has increased allowing consumers greater access to these marketing campaigns, which has allowed consumers to further educate themselves about commercial products and services.

SUMMARY

Embodiments of the present invention provide a method, system, and program product for a system for executing a video summary is managed.

A first embodiment encompasses a method for a system for executing a video summary is managed. One or more processors generate one or more video segments for a video based on digital media data. One or more processors generate a video summary based on a user request.

A second embodiment encompasses a computer program product for a system for executing a video summary is managed. The computer program product includes one or more computer-readable storage media and program instructions stored on the one or more computer-readable storage media. The program instructions include program instructions to generate one or more video segments for a video based on digital media data. The program instruction includes program instructions to generate a video summary based on a user request.

A third embodiment encompasses a computer system for a system for executing a video summary is managed. The computer system includes one or more computer processors, one or more computer readable storage medium, and program instructions stored on the computer readable storage medium for execution by at least one of the one or more processors. The computer program product includes one or more computer-readable storage media and program instructions stored on the one or more computer-readable storage media. The program instructions include program instructions to generate one or more video segments for a video based on digital media data. The program instructions include program instructions to generate a video summary based on a user request.

DETAILED DESCRIPTION

Figure 1:
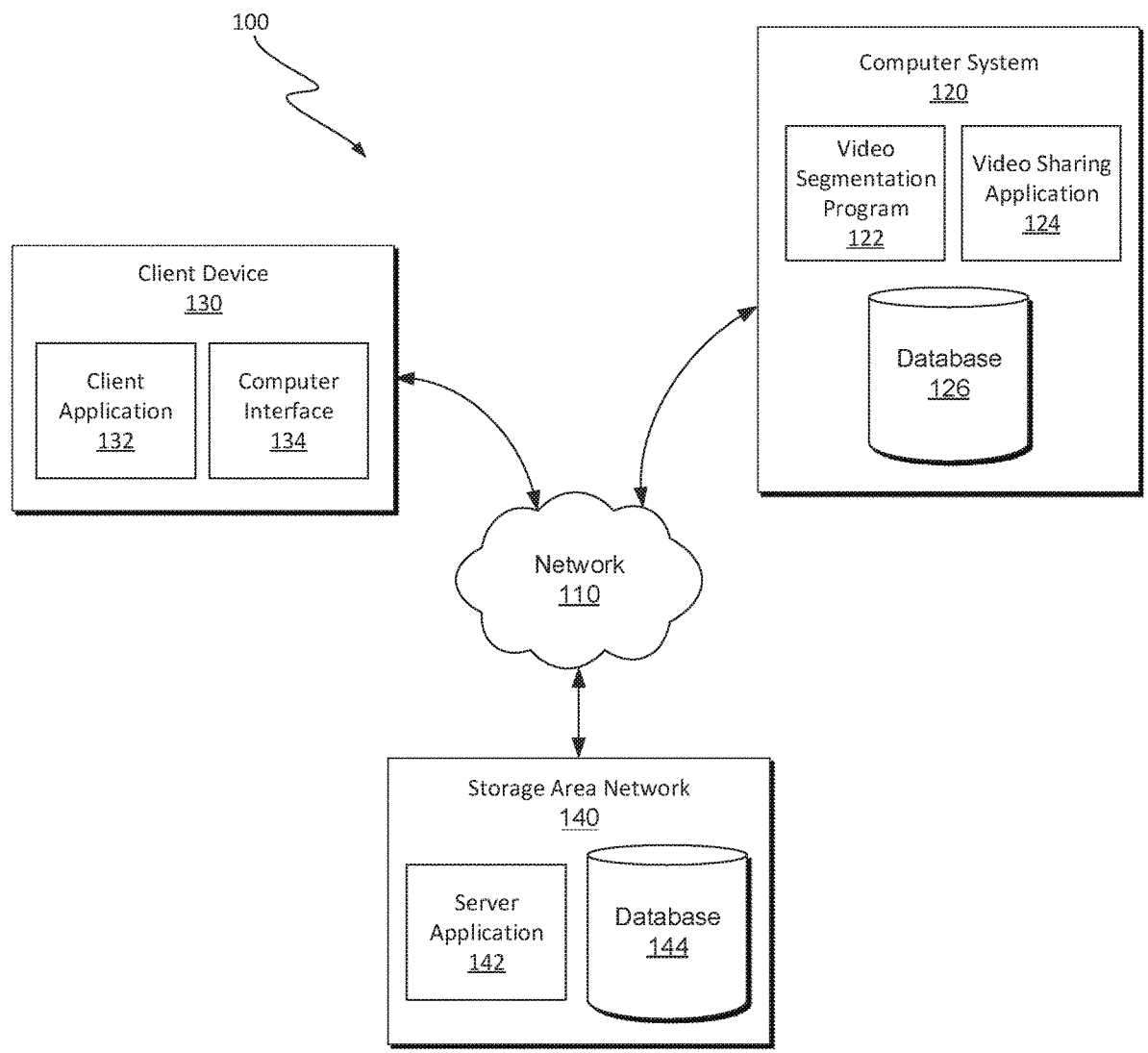
FIG. 1 is a functional block diagram illustrating a computing environment, in which a system for executing a video summary is managed, in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While possible solutions to video annotation summary are known, these solutions may be inadequate to generate a video annotation summary based, at least, on crowd-based comments associated with video direct accesses. Embodiments of the present invention recognize that such solutions can be improved by analyzing crowd-based comments associated with video direct accesses that correlate with video segments and generate additional content that directly communicate the commercial products and/or services review that the consumer is searching for.

In general, commercial products and/or services that are marketed utilizing video-sharing webpages are often lengthy and contain numerous and vital pieces of information for a consumer. However, these videos are often filled with unnecessary and necessary dialogue that is interjected between the numerous and vital information that the consumer is seeking. Generally, video annotation summaries using crowd-based comments are added in a comments section attached to the commercial products and/or services review.

Embodiments of the present invention recognize that in various embodiments, natural language processing, word2vec, and cognitive AI processing represent models utilized to analyze crowd-based comments and video direct accesses to generate one or more video segments associated with a video. In various embodiments, word2vec is a group of related models that are used to produce word embeddings. These models are shallow, two-layer neural networks that are trained to reconstruct linguistic contexts of words.

Word2vec takes as its input a large corpus of text and produces a vector space, typically of several hundred dimensions, with each unique word in the corpus being assigned a corresponding vector in the space. In various embodiments, cognitive AI processing is utilized to analyze and learn from the corresponding crowd-based comments. Further, embodiments provide text processing to analyze the crowd-based comments and video direct accesses to determine whether one or more crowd-based comments and/or video direct accesses provide substantive feedback associated, at least, with one segment of the video to generate a video summary. When text processing is utilized to determine one or more video segments, it allows for a wide range of feedback to be captured by the present invention. Additionally, text processing allows the present invention to identify product reviews from various consumers who purchased, will purchase, and/or have used a commercial product or service in the past.

Embodiments of the present invention recognize that video-sharing webpages may not provide adequate detail to inform consumers about commercial products and/or services. Embodiments provide video annotation summaries based, at least, on crowd-based comments associated with video direct accesses. Further, embodiments provide for a compilation of video segments into a cohesive video annotation summary based, at least, on crowd-based annotation comments and video direct accesses. When such as video annotation summary is generated it allows for consumers to readily access commercial product and/or service reviews and marketing, which can then be leveraged by consumers to adequately make informed and responsible purchases. Such an approach often increases the level of notoriety and sales of a commercial product and/or service, as well as adequately inform consumers about a product and/or service that they are searching for in particular.

In one embodiment of the present invention, video segmentation program 122 generates one or more video segments for a video based on one or more digital media data. Video segmentation program 122 generates a video summary based on a user request.

In one embodiment of the present invention, video segmentation program 122 receives a user request. Video segmentation program 122 executes a query on a database based on the user request. Video segmentation program 122 identifies one or more digital media data associated with the user request. Video segmentation program 122 receives the one or more digital media.

In one embodiment of the present invention, video segmentation program 122 analyzes the one or more digital media data. Video segmentation program 122 identifies data associated with the digital media data that includes (i) one or more videos, (ii) one or more crowd-based comments, and (iii) one or more video direct accesses. Video segmentation program 122 generates an analysis result by analyzing the one or more digital media data using one or a combination of (i) natural language processing, (ii) word2vec, (iii) cognitive AI processing, (iv) video processing, and (v) machine vision. Video segmentation program 122 identifies one or more user feedback associated the one or more digital media data based on the analysis result.

In one embodiment of the present invention, video segmentation program 122 analyzes the one or more user feedback. Video segmentation program 122 identifies one or more user feedback that reaches a threshold value of similarity to the user request. Video segmentation program 122 identifies that the one or more user feedback reaches a threshold value of similarity based on a result of a semantic analysis of (i) the user request and (ii) the one or more user feedback.

In one embodiment of the present invention, video segmentation program 122 generates one or more video segments based on the user feedback associated with the one or more digital media data. Video segmentation program 122 generates an aggregate of the one or more video segments, wherein the aggregate includes a video direct access that is associated with a specific timestamp at which a given video segment begins.

In one embodiment of the present invention, video segmentation program 122 generates the video summary which includes (i) the aggregate of the one or more video segments, (ii) the one or more digital media data. Video segmentation program 122 generates one or more labels for the video summary based on (i) an analysis of a crowd-based comment that points to a video segment and (ii) on one or a combination of words, hash representation, or n-gram structures. Video segmentation program 122 generates a ranking for the one or more video segments based on a calculated score of the content of the one or more crowd-based comments, wherein the given calculated score is based on a feedforward neural network used to determine a weighting factor associated with features associated with the one or more video segments.

In one embodiment of the present invention, video segmentation program 122 plays the video summary for one or more users. Video segmentation program 122 receives user activity associated with the one or more users. Video segmentation program 122 analyzes a user activity. Video segmentation program 122 updates the one or more video segments associated with the video summary based on the view time of the one or more video segments.

In one embodiment of the present invention, video segmentation program 122 identifies one or more crowd-based interactions associated with the one or more videos. Video segmentation program 122 generates an analysis by analyzing the one or more crowd-based interactions that include one or a combination of: (i) crowd-based interaction with the one or more videos, (ii) one or more crowd-based comments associated with one or more segments of the one or more videos, or (iii) one or more crowd-based reactions associated with the one or more videos. Video segmentation program 122 determines the one or more video segments based on the analysis result.

The present invention will now be described in detail with reference to the Figures.

FIG. 1 is a functional block diagram illustrating a computing environment, generally designated 100, in accordance with an embodiment of the present invention. Computing environment 100 includes computer system 120, client device 130, and storage area network 140 connected over network 110. Computer system 120 includes video segmentation program 122, video sharing application 124, and database 126. Client device 130 includes client application 132 and computer interface 134. Storage area network (SAN) 140 includes server application 142 and database 144.

In various embodiment of the present invention, computer system 120 is a computing device that can be a standalone device, a server, a laptop computer, a tablet computer, a netbook computer, a personal computer (PC), a personal digital assistant (PDA), smartwatch, a desktop computer, servers, server-cluster, web servers or any programmable electronic device capable of receiving, sending, and processing data. In general, computer system 120 represents any programmable electronic device or combination of programmable electronic devices capable of executing machine readable program instructions and communicating with client device 130 and SAN 140, and other computing devices (not shown) within computing environment 100 via a network, such as network 110. In another embodiment, computer system 120 represents a computing system utilizing clustered computers, components to act as a single pool of seamless resources. In general, computer system 120 can be any computing device or a combination of devices with access to client device 130 and SAN 140 and is capable of executing video segmentation program 122 and video sharing application 124. Computer system 120 may include internal and external hardware components, as depicted and described in further detail with respect to FIG. 7.

In this exemplary embodiment, video segmentation program 122 and video sharing application 124 are stored on computer system 120. However, in other embodiments, video segmentation program 122 and video sharing application 124 may be stored externally and accessed through a communication network, such as network 110. Network 110 can be, for example, a local area network (LAN), a wide area network (WAN) such as the Internet, or a combination of the two, and may include wired, wireless, fiber optic, or any other connection known in the art. In general, network 110 can be any combination of connections and protocols that will support communications between computer system 120, client device 130, and SAN 140, in accordance with a desired embodiment of the present invention.

Additionally, in some embodiments, computer system 120 represents a cloud computing platform. Cloud computing is a model or service delivery for enabling convenient, on demand network access to a shared pool of configurable computing resources (e.g., networks, network bandwidth, servers, processing, memory, storage, applications, virtual machines, and services) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model, and can be implemented as various deployment models including as a private cloud, a community cloud, a public cloud, and a hybrid cloud.

In various embodiments of the present invention, client device 130 is a computing device that can be a standalone device, a server, a laptop computer, a tablet computer, a netbook computer, a personal computer (PC), a personal digital assistant (PDA), a smartphone, a smartwatch, smart glasses, a desktop computer, or any programmable electronic device or combination of programmable electronic devices capable of executing machine readable program instructions and communicating with computer system 120, and SAN 140 and other computing devices (not shown) within computing environment 100 via a network, such as network 110. In another embodiment, client device 130 represents a computing system utilizing clustered computers and components to act as a single pool of seamless resources. In general, client device 130 can be any programmable device or a combination of devices with access to computer system 120, SAN 140, and network 110 and is capable of executing client application 132 and computer interface 134. Client device 130 may include internal and external hardware components, as depicted and described in further detail with respect to FIG. 7.

Client device 130 includes computer interface 134. Computer interface 134 provides an interface between client device 130, computer system 120, and SAN 140. In some embodiments, computer interface 134 can be a graphical user interface (GUI) or web user interface (WUI) and can display text, documents, web browser, windows, user options, application interfaces, and instructions for operations, and includes the information (such as graphic, text, and sound) that a program presents to a user and the control sequences the user employs to control the program. In some embodiments, client device 130 accesses data communicated from computer system 120 and/or SAN 140 via client-based application that runs on client device 130. For example, client device 130 includes mobile application software that provides an interface between client device 130, computer system 120, and SAN 140.

Storage area network (SAN) 140 is a storage system that includes server application 142 and database 144. SAN 140 may include one or more, but is not limited to, computing devices, servers, server-clusters, web servers, databases and storage devices. SAN 140 operates to communicate with computer system 120, client device 130, and various other computing devices (not shown) over a network, such as network 110. For example, SAN 140 communicates with video segmentation program 122 to transfer data between, but is not limited to, computer system 120, client device 130, and various other computing devices (not shown) that are connected to network 110. SAN 140 can be any computing device or a combination of devices that are communicatively connected to a local IoT network, i.e., a network comprised of various computing devices including, but are not limited to computer system 120 and client device 130 to provide the functionality described herein. SAN 140 can include internal and external hardware components as described with respect to FIG. 7. The present invention recognizes that FIG. 1 may include any number of computing devices, servers, databases, and/or storage devices, and the present invention is not limited to only what is depicted in FIG. 1. As such, in some embodiments, some or all of the features and functions of SAN 140 are included as apart of computer system 120, client device 130 and/or another computing device. Similarly, in some embodiments, some of the features and functions of computer system 120 are included as part of SAN 140 and/or another computing device.

Additionally, in some embodiments, SAN 140 represents a cloud computing platform Cloud computing is a model or service delivery for enabling convenient, on demand network access to a shared pool of configurable computing resources (e.g., networks, network bandwidth, servers, processing, memory, storage, applications, virtual machines, and services) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model; and can be implemented as various deployment models including as a private cloud, a community cloud, a public cloud, and a hybrid cloud.

In various embodiments, SAN 140 is depicted in FIG. 1 for illustrative simplicity. However, it is to be understood that, in various embodiments, SAN 140 can include any number of databases that are managed in accordance with the functionality of server application 142. In general, database 144 represents data and server application 142 represents code that provides an ability to take specific action with respect to another physical or virtual resource and manages the ability to use and modify the data. In an alternative embodiment, video segmentation program 122 can also represent any combination of the aforementioned features, in which server application 142 has access to database 144. To illustrate various aspects of the present invention, examples of server application 142 are presented in which video segmentation program 122 represents one or more of, but is not limited to, a local IoT network and contract event monitoring system.

In this exemplary embodiment, server application 142 and database 144 are stored on SAN 140. However, in other embodiments, server application 142 and database 144 may be stored externally and accessed through a communication network, such as network 110, as discussed above.

In the embodiment depicted in FIG. 1, server application 142, at least in part, has access to video segmentation program 122 and can communicate digital media data stored on SAN 140 to computer system 120 and/or client device 130. Alternatively, video segmentation program 122 has access to server application 142 and can communicate digital media data stored on computer system 120, SAN 140, and client device 130. In some embodiments, computer system 120 and SAN 140 have access to various other computing devices (not shown) and can communicate data stored, respectively on computer system 120, client device 130, and SAN 140 to the various other computing devices. For example, video segmentation program 122 defines a video augmentation system for computer system 120 that has access to digital media data on SAN 140 and has access to digital media data on other computer systems (e.g., various other computing devices).

In various embodiments, SAN 140 represents an internet-based service for video sharing. In various embodiments, SAN 140 encompasses software, servers, databases, webservers, and web pages support by software to operate and maintain an internet-based service for video sharing. Users of the Internet have access to web pages maintained and supported by SAN 140 via the Internet. One or more users of the Internet (i.e., crowd) have the availability to comment on various videos uploaded to SAN 140 and accessible via the web pages, as well as upload videos to SAN 140, respectively.

In various embodiments depicted in FIG. 1, digital media data is, at least in part, obtained from client device 130 and/or SAN 140. As discussed above, SAN 140 represents an internet-based service for video sharing. Digital media data is stored on database 144. However, in various embodiments, digital media data can be stored on client device 130 and/or stored on various other computing devices (not shown). In various embodiments, digital media data represents various videos stored on SAN 140, as well as the various crowd comments and various video direct accesses stored on SAN 140. In some embodiments, digital media data represents various video summaries and video features associated, at least, with the various video summaries. In some embodiments, video summaries represent video segments generated by video segmentation program 122 based, at least, on a user-generated request. Additionally, video features represent tags associated with the content of the various video segments and video summaries.

In various embodiments, embodiments depicted in FIG. 1, digital media data originates within SAN 140. The present invention recognizes that digital media data is associated, at least, with video-sharing uploads and crowd-based comments that occur between the video-sharing system and the crowd. In some embodiments, server application 142 communicates with computer system 120 and communicates digital media data to computer system 120, wherein server application 142, at least, communicates with video segmentation program and/or video sharing application 124. In an alternative embodiment, video segmentation program 122 communicates a set of program instructions to server application 142 instructing server application 142 to transmit digital media data to computer system 120. In yet another embodiment, video segmentation program 122 communicates with SAN 140 and retrieves digital media data from SAN 140.

In various embodiments of the present invention, a user of client device 130 (hereinafter "requestor") generates a user request and communicates the request to computer system 120. In various embodiments, the user request is associated with a specific content that the requestor is interested in obtaining information with regards to the specific content. In some embodiments, the user request contains one or more keyword searches associated with the specific content. Client application 132 generates the user request based, at least in part, on the one or more keyword searches and communicates the user request to computer system 120 to generate a video summary regarding the specific content.

In various embodiments, in response to computer system 120 receiving a user request from client device 130, video segmentation program 122 analyzes the user request. Video segmentation program 122 identifies one or more keyword searches associated with the user request. In various embodiments, video segmentation program 122 communicates with SAN 140 and executes a query for digital media (e.g., videos) associated with the one or more keyword searches. In some embodiments, video segmentation program 122 communicates with server application 142 to perform a query of database 144 for videos associated with the one or more keyword searches. In various embodiments, video segmentation program 122 communicates a set of program instructions to server application 142 instructing server application 142 to execute a query for videos associated with the one or more keyword searches. Additionally, the set of program instructions instruct server application 142 to communicate the digital media results to video segmentation program 122. In some embodiments, video segmentation program 122 access database 144 executing on SAN 140 and executes query for videos associated with the one or more keyword searches and communicates with server application 142 to retrieve the video results based, at least, on the query of database 144.

In an alternative embodiment, a requestor of client device 130 performs a query for videos associated with the one or more keyword searches. In some embodiments, client application 132 communicates a set of program instructions to server application 142 executing on SAN 140 instructing server application 142 to perform a query on database 144 for videos associated with the one or more keyword searches. In various embodiments, server application 142 locates various videos associated with the keyword searches (e.g., list of videos, digital media results) and communicates the digital media results to client application executing on client device 130. Client application 132 generates a user request based, at least, on the results of the video query (e.g., list of videos, digital media results) and communicates the user request to computer system 120.

In various embodiments, video segmentation program 122 identifies the digital media results which includes, but it not limited to, (i) one or more videos, (ii) one or more video direct accesses, and/or (iii) one or more crowd-based comments. Additionally, video segmentation program 122 analyzes the digital media results based, at least, on the content of the user request. The present invention recognizes that the invention utilizes, but is not limited to, one or a combination of: speech to text processing, video image processing, natural language processing, Word2vec, cognitive AI processing, etc., to analyze the various digital media results.

In various embodiments of the present invention, video segmentation program 122 analyzes the crowd-based comments and video direct accesses, wherein video segmentation program 122 is searching for a threshold value that aligns with the keywords associated with the user request. One having ordinary skill in the art would understand that video segmentation program 122 utilizes algorithms including, but is not limited to, image processing, video processing, machine vision, natural language processing, cognitive AI, etc., to analyze the digital media data (e.g., crowd-based comments, video direct accesses, etc.). In some embodiments, video segmentation program 122 analyzes the digital media data to identify videos that meet a threshold value that align with the one or more keywords of the user request.

In various embodiments, based, at least in part, on the analyzation performed by video segmentation program 122, video segmentation program 122 identifies one or more videos and the one or more digital media associated with the one or more videos that reaches a threshold value. In some embodiments, video segmentation program 122 identifies one or more videos that contains one or more digital media data (e.g., crowd-based comments, video direct accesses, etc.) that correlate with the one or more keywords associated with the user request.

In one embodiment and example, video segmentation program 122 receives a user request from client device 130, requesting video segmentation program 122 to generate a video summary associated with a commercial product based, at least, on (i) one or more videos. (ii) crowd-based comments, (iii) and video direct accesses. In various embodiments, video segmentation program 122 executes a query on database 144 for various videos and one or more digital media data. In some embodiments, video segmentation program 122 communicates with server application 142 to perform the query on database 144 and, additionally, server application 142 receives a set of program instructions instructing server application 142 to communicate the digital media results associated with the query to video segmentation program 122. Video segmentation program 122 receives the digital media results and analyzes the digital media data. In various embodiments, video segmentation program 122 identifies one or more crowd-based comments associated with the videos of the digital media results that articulate a positive review of the commercial product and/or a negative review of the commercial product (i.e., content related with user request). In some embodiments, the one or more identified crowd-based comments include one or more video direct access that direct the viewer of the video to a specific point-in-time of the video. In some embodiments video segmentation 122 identifies that a video direct access is associated with a crowd-based comment (e.g., positive feedback, negative feedback, or neutral feedback).

In various embodiments, video segmentation program 122 retrieves the video file associated with the identified digital media data from database 144, and video segmentation program 122 clips the segment of the video file based, at least, on the identification of content related with the user request associated with (i) one or more crowd-based comments and (ii) one or more video direct accesses. Video segmentation program 122 stores the segmented video on database 126. Additionally, video segmentation program 122 retrieves one or more video files associated with the identified digital media data, and clips additional segments from the one or more video files based, at least, on the identification of content related with the user request associated with (i) one or more crowd-based comments and (ii) one or more video direct accesses. Video segmentation program 122 stores the additional one or more segmented videos on database 126 for subsequent use. The present invention recognizes that a segmented video represents a portion and/or segment of video associated with the original video file, wherein video segmentation program 122 clipped the segmented video from the original video file.

In various embodiments of the present invention, video segmentation program 122 retrieves one or more video segments from database 126 that are associated with the user request. Video segmentation program 122 assigns a threshold value (e.g., a rank) to the one or more video segments from a highest to lowest value (i.e., provide the most information to least information) based, at least in part, on a threshold value identified on the analyzation of the digital media data by video segmentation program 122. In some embodiments, video segmentation program 122 retrieves one or more video segments and analyzes the video segments and the associated crowd-based comments to determine the most similar and least similar video segments based, at least, on the user request.

The present invention recognizes that video segmentation program 122 utilizes one or a combination of: video processing, image processing, natural language processing, Word2vec, machine vision, etc., to analyze the video segments and associated with crowd-based comments. In various embodiments, video segmentation program 122 analyzes the one or more video segments and crowd-based comments and determines which video segments and associated crowd-based comments provide the most information relative to the user request, and which video segments and associated crowd-based comments provide the least information relative to the user request. In various embodiments, video segmentation program 122 determines the threshold value of one or more video segments based, at least, on the following, but is not limited to, (i) the content of the video segment, (ii) the positive and/or negative feedback of the one or more crowd-based comments, (iii) the quantity of the one or more crowd-based comments.

In various embodiments, video segmentation program 122 generates a ranked list of one or more video segments and associated crowd-based comments, respectively. The present invention recognizes that the ranked list is generated based, at least in part, on the threshold value assigned to the one or more video segments and associated crowd-based comments.

In various embodiments of the present invention, video segmentation program 122 generates a video summary that includes, but is not limited to, (i) one or more video segments, (ii) one or more crowd-based comments associated with the one or more video segments, and (iii) various video summary data associated with the video segments (i.e., title of video files, length of video segments, URL links to original video files, etc.). In various embodiments, video segmentation program 122 generates the video summary by splicing the one or more video segments together to form one cohesive video. In various embodiments, video segmentation program 122 embeds video direct access into the video summary associated, at least, with the one or more crowd comments to allow the user to skip to specific portions of the video summary. Additionally, video segmentation program 122 embeds hyperlinks of the URL links to the original video files within the video summary.

In various embodiments, video segmentation program 122 communicates the video summary to client application 132 with program instructions instructing client application 132 to populate the video summary on computer interface 134 for the requestor to view. In some embodiments, video segmentation program 122 communicates a set of program instructions instructing client application 132 to record the user activity with the video summary which includes, but is not limited to, the quantity of each video segment viewed by the requestor and whether the requestor accessed one or more embedded hyperlinks associated with a video segment and crowd-based comment, respectively. Additionally, video segmentation program 122 further communicates a set of program instructions to client application 132 instructing client application 132 to communicate one or more user activity to video segmentation program 122. In various embodiments, video segmentation program 122 receives one or more user activity from client application 132 and stores the one or more user activity on database 126. In alternative embodiment, video segmentation program 122 communicates the video summary to video sharing application 124 with program instructions instructing video sharing application 124 to upload the video summary to a video sharing platform (e.g., SAN 140).

In various embodiments of the present invention, video segmentation program 122 receives user activity based, at least in part, on the user's activity of the, at least, one video summary, as recognized above. Video segmentation program 122 analyzes the user's activity and identifies data including, but not limited to, (i) the quantity of time viewed of each video segment, respectively, and (ii) the amount of embedded hyperlinks associated with the, at least, one video summary the user accessed. Video segmentation program 122 determines based, at least, on the analyzation of the user activity whether to adjust, alter, and/or update the content of the video summary. The present invention recognizes video segmentation program 122 analyzes the user activity associated with the content of the video summary, and in various embodiments, video segmentation program 122 identifies user activity that includes, but is not limited to, (i) the user views and/or accesses content contained within the video summary, and/or (ii) the user does not views and/or access content contained within the video summary. In various embodiments, video segmentation program 122 analyzes the user activity and identifies that the user viewed the video summary in its entirety and accessed a threshold value of embedded hyperlinks associated with the video summary. Based, at least, on this identification, video segmentation program 122 determines that the video summary does not need to be updated.

In various embodiments of the present invention, video segmentation program 122 analyzes the user activity and identifies data including, but not limited to, (i) the quantity of time viewed of each video segment, respectively, and (ii) the amount of embedded hyperlinks associated with the, at least, one video summary the user accessed. In some embodiments, video segmentation program 122 identifies that the user watched a threshold value of time for one or more video segments and accessed a threshold value of embedded hyperlinks, wherein video segmentation program 122 determines that the video summary does not require an update. In some embodiments, however, video segmentation program 122 analyzes the user activity and identifies that the user did not view one or more video segments for a threshold value of time and/or the user did not access a threshold value number of embedded hyperlinks associated with the video summary, based, at least, on the identifications by video segmentation program 122, video segmentation program 122 determines that the video summary does require an update. In various embodiments, video segmentation program 122 analyzes the user activity and identifies content contained within the video summary that the user views and/or accessed that reached a threshold value, additionally, video segmentation program 122 identifies content contained within the video summary that user did not view and/or access to reach a threshold value, wherein video segmentation program 122 determines that the content within the video summary that did not reach a threshold value of views and/or accesses must be updated.

In various embodiments, video segmentation program 122 updates the, at least, one video summary, wherein video segmentation program 122 determines that the, at least, one video summary requires an update based, at least in part, on the analyzation of the user activity associated with a user viewing the video summary. Video segmentation program 122 communicates with server application 142 and executes, at least, a second query on database 144, as recognized above, for additional videos and crowd-based comments (e.g., additional digital media data) based, at least, on (i) the user request and (ii) the user activity associated with, at least, the one video summary. In some embodiments, video segmentation program 122 communicates a set of program instructions to server application 142 to retrieve additional videos and crowd-based comments and communicate the additional videos crowd-based comments to video segmentation program 122. In various embodiments, video segmentation program 122 analyzes the additional digital media data and identifies (i) one or more crowd-based comments, (ii) one or more video direct accesses, and (iii) one or more video segments that resembles content related with the user request. Additionally, video segmentation program 122 identifies additional content related with the user request that is distinct from the content within the video summary that did not reach a threshold value of views and/or accesses. In various embodiments, video segmentation program 122 retrieves the identified additional content that is distinct from the content within the video summary that did not reach a threshold value, wherein, video segmentation program 122 clips the content within the video summary that did not reach the threshold value and replaces with the identified additional content. In some embodiments, video segmentation program 122 analyzes the identified additional content and the content that did reach a threshold value and assigns a rank to the content, as recognized above. Video segmentation program 122 organizes the content in a list from the highest to lowest rank, as recognized above. Video segmentation program 122 stores the updated video summary on database 126. In some embodiments, video segmentation program 122 communicates the updated video summary to client device 130, as discussed above. In additional embodiments, video segmentation program 122 communicates the updated video summary to video sharing application 124 to be uploaded to the video sharing website, as discussed above.

In one embodiment and example of the present invention, a user of client device 130 (e.g., requestor) generates a user request to compare zipper backpacks that includes, but is not limited to, keywords (e.g., school backpack, rucksack, laptop case, sling bag, tote backpack, etc.), description of backpack (e.g., size, shape, color, etc.), and additional features (e.g., demonstration of use of the various backpacks). Video segmentation program 122 receives the user request and communicates with server application 142 to execute a query for videos that meet the criteria defined within the user request. In various embodiments, video segmentation program 122 receives digital media data that includes, but is not limited to: (i) one or more videos, (ii) one or more crowd-based comments, (iii) one or more video direct accesses, and (iv) various meta associated with the one or more videos, one or more crowd-based comments, and the one or more video direct accesses. Upon receipt of the digital media data, video segmentation program 122 analyzes the digital media data.

In the embodiment and example presented, video segmentation program 122 analyzes the digital media data to identify various feedback associated with the user request. In some embodiments, video segmentation program 122 analyzes the one or more crowd-based comments and identifies one or more crowd-based comments that provide substantive feedback (e.g., positive and/or negative feedback) associated with a consumer product (e.g., a zipper backpack) within a video. In some embodiments, video segmentation program 122 identifies that, at least, one video direct access is associated with, at least, one crowd-based comment. Video segmentation program 122 utilizes the video direct access to facilitate the clipping of the video file. Video segmentation program 122 analyzes the video file and identifies a segment of the video file to clip based, at least in part, on (i) a crowd-based comment and (ii) a video direct access. In the embodiment presented, video segmentation program 122 identified a video segment that depicted the illustration and representation of a zipper backpack and the functionality of the zipper, respectively, that matched a threshold value of the criteria of the user request. Video segmentation program 122 generates, at least, on video segment. The present invention further recognizes that video segmentation program 122 analyzes one or more videos associated with (i) one or more crowd-based comments and (ii) one or more video direct access to generate one or more video segments. Video segmentation program 122 operates to splice the one or more video segments together to create one cohesive video. Additionally, video segmentation program 122 generates a video summary associated with, at least, (i) one or more video segments related to zipper backpacks, (ii) one or more crowd-based comments that include, but not limited to, substantive feedback, (iii) one or more video direct accesses associated, at least, with the video files of the one or more video segments, and (iv) various summary data associated with the video segments (i.e., title of video files, length of video segments, URL links to original video files, etc.). Video segmentation program 122 communicates the video summary to client device 130 with program instructions to populate computer interface 134 with the video summary. In some embodiments, video segmentation program 122 communicates the video summary to video sharing application 124 to be communicated to SAN 140 and uploaded to the video sharing website.

In one embodiment and example, a user of client device 130 (e.g., requestor) generates a user request to compare volume and cargo space of the interior of a vehicle that includes, but is not limited to, keywords. Video segmentation program 122 receives the user request and communicates with server application 142 to execute a query for videos that meet the criteria defined within the user request. In various embodiments, video segmentation program 122 receives digital media data that includes, but is not limited to: (i) one or more videos, (ii) one or more crowd-based comments, (iii) one or more video direct accesses, and (iv) various meta associated with the one or more videos, one or more crowd-based comments, and the one or more video direct accesses. Upon receipt of the digital media data, video segmentation program 122 analyzes the digital media data.

In the embodiment and example presented, video segmentation program 122 analyzes the digital media data to identify various feedback associated with the user request. In some embodiments, video segmentation program 122 analyzes the one or more crowd-based comments and identifies one or more crowd-based comments that provide substantive feedback (e.g., positive and/or negative feedback) associated with a one or more vehicles within a video. In some embodiments, video segmentation program 122 identifies that, at least, one video direct access is associated with, at least, one crowd-based comment. Video segmentation program 122 utilizes the video direct access to facilitate the clipping of the video file. Video segmentation program 122 analyzes the video file and identifies a segment of the video file to clip based, at least in part, on (i) a crowd-based comment and (ii) a video direct access. Video segmentation program 122 generates a video summary associated with, at least, (i) one or more video segments related to vehicles, (ii) one or more crowd-based comments that include, but not limited to, substantive feedback, (iii) one or more video direct accesses associated, at least, with the video files of the one or more video segments, and (iv) various summary data associated with the video segments (i.e., title of video files, length of video segments, URL links to original video files, etc.). Video segmentation program 122 communicates the video summary to client device 130 with program instructions to populate computer interface 134 with the video summary.

In various embodiments of the present invention, video segmentation program 122 receives one or more digital media data. In various embodiments, video segmentation program 122 analyzes the crowd-based interactions associated with the one or more videos. The present invention recognizes that the crowd-based interactions include one of, or a combination of: crowd-based interactions with various segments of the one or more videos, one or more crowd-based comments, one or more crowd-based reactions (e.g., like, dislike, emotes, shares, etc.). In some embodiments, video segmentation program 122 determines one or more video segmentations based, at least in part, on (i) the one or more crowd-based interactions associated with the one or more video segments.

Figure 2:
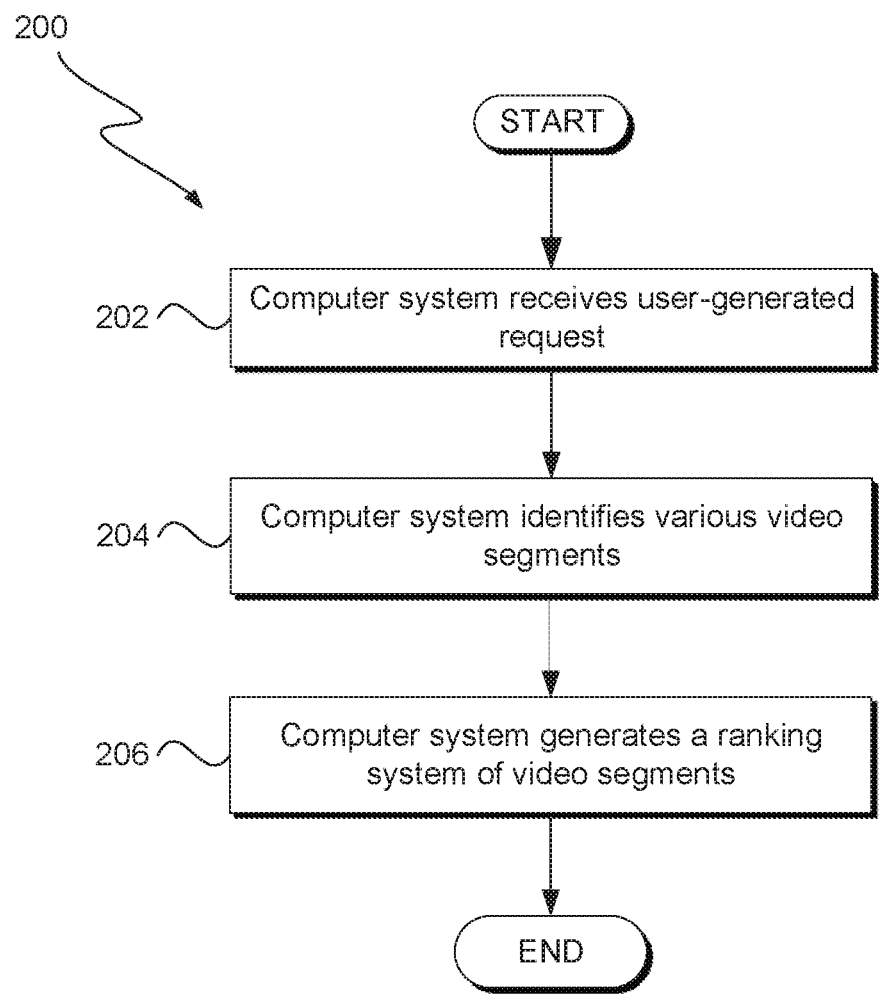
FIG. 2 illustrates operational processes of a system for executing a video summary, on a computing device within the environment of FIG. 1, in accordance with an exemplary embodiment of the present invention.

FIG. 2 is a flowchart depicting operations for executing a video summary system for computing environment 100, in accordance with an illustrative embodiment of the present invention. More specifically, FIG. 2, depicts combined overall operations, 200, of video segmentation program 122 executing on computer system 120 to manage generation of video summaries based, at least, on digital media data. In some embodiments, operations 200 represents logical operations of video segmentation program 122, wherein interactions between client application 132 executing on client device 130 and server application 142 executing on SAN 140 represent interactions between logical units executing on computer system 120. It should be appreciated that FIG. 2 provides an illustration of one implementation and does not imply any limitations with regard to the environment in which different embodiments may be implemented. Many modifications to the depicted environment may be made. In one embodiment of flowchart 200, the series of operations can be performed in any order. In another embodiment of flowchart 200, the series of operations can be performed in any order. In another embodiment, the series of operations, in flowchart 200, can be terminated at any operation. Additionally, any operations of flowchart 200, can be resumed at any time.

In operation 202, video segmentation program 122 receives a user request from client device 130 to generate a video summary based, at least, on (i) one or more keywords and/or (ii) a query search associated with digital media data. In various embodiments of the present invention, video segmentation program 122 communicates with server application 142 to execute a query on database 144 based, at least, on the one or more keywords. The present invention recognizes that a query on database includes, but is not limited to, searching for data stored on the database in view of one or more keywords. In some embodiments, based, at least, on a set of program instructions, server application 142 retrieves one or more digital media data associated with the query and communicates the one or more digital media data to video segmentation program 122. In some embodiments video segmentation program 122 receives the digital media data.

In various embodiments of the present invention, video segmentation program 122 analyzes the digital media results and identifies data which includes, but is not limited to, (i) one or more videos, (ii) one or more video direct accesses, and/or (iii) one or more crowd-based comments. Additionally, video segmentation program 122 analyzes the digital media results based, at least, on the content (e.g., keywords) of the user request. The present invention recognizes that the invention utilizes one or a combination of but is not limited to: speech to text processing, video image processing, natural language processing, cognitive AI processing, etc. to analyze the various digital media results.

In various embodiments of the present invention, video segmentation program 122 analyzes the (i) one or more videos, (ii) one or more video direct accesses, and/or (iii) one or more crowd-based comments. Video segmentation program 122 analyzes the above data to identify content that reaches a threshold value of similarity to the one or more keywords from the user request to generate a video summary. In various embodiments, video segmentation program 122 analyzes the data to identify one or more videos, one or more video direct access, and/or one or more crowd-based comments that depict content based, at least, on the video summary the user request asks to generate. The present invention recognizes that video segmentation program 122 utilizes algorithms and/or programs which include, but are not limited to: image processing, video processing, machine vision, natural language processing, cognitive AI, etc., to analyze the digital media data (e.g., crowd-based comments, video direct accesses, etc.).

In one embodiment and example, the user request requests video segmentation program 122 to generate a video summary of a commercial product. In some embodiments, video segmentation program 122 receives digital media data that includes, but is not limited to: (i) one or more videos that include, but are not limited to, infomercials, consumer product reviews, etc., (ii) one or more crowd-based comments associated with the one or more videos, and (iii) one or more video direct accesses that are associated with the one or more crowd-based comments. Video segmentation program 122 analyzes the (i) one or more videos, (ii) one or more crowd-based comments, and (iii) one or more video direct accesses, and identifies content within the digital media data that depicts and/or articulates information that relates to the commercial product the requestor is seeking additional information on.

The present invention recognizes that video segmentation program 122 analyzes the digital media data to identify feedback (e.g., positive and/or negative feedback) that can assist the requestor by providing information regarding the commercial product. In various embodiments, video segmentation program 122 identifies feedback from one or more crowd-based comments that include one or more video direct accesses that are associated with, at least, one video. Video segmentation program 122 determines that one or more video segments should be clipped from the, at least, one video file based, at least, in part, on identification of (i) the feedback and (ii) the one or more video direct accesses associated with the feedback with the commercial product. In some embodiments, video segmentation program 122 identifies feedback contained within, at least, one video (e.g., infomercial, consumer product review, etc.) and determines that one or more video segments should be clipped from the video file. The present invention recognizes that video segmentation program 122 utilizes programs and/or algorithms that include, but are not limited to: machine vison, video processing, image processing, natural language processing, speech to text processing to determine whether content contained within a video should be clipped into one or more video segments.

In operation 204, video segmentation program 122 identifies one or more video segments associated with the digital media data that reaches a threshold value to generate a video summary. In various embodiments, video segmentation program 122 analyzes the one or more crowd-based comments and video direct accesses that are associated with the one or more crowd-based comments and identifies one or more video segments that reaches a threshold value. Video segmentation program 122 retrieves the video file associated with the (i) one or more videos, (ii) the one or more crowd-based comments, and (iii) one or more video direct accesses from database 144. Upon retrieving the video file, video segmentation program 122 clips the segment of the video file associated with the video segment identified by analyzing (i) the video, (ii) the one or more crowd-based comments, and (iii) the one or more video direct accesses. Video segmentation program 122 stores the one or more video segments on database 126. The present invention recognizes that there may be one or more video segments clipped from, at least, one video that video segmentation program 122. Additionally, the present invention also recognizes that there may be more than one video file that video segmentation program 122 clips.

In operation 206, video segmentation program 122 retrieves the one or more video segments from database 126 and analyzes the one or more video segments to generate a ranked list from a highest to lowest value (i.e., provide the most information to least information). In various embodiments of the present invention, video segmentation program 122 retrieves the various digital media data associated with the one or more video segments and analyzes the content of the digital media data to identify data points that are most similar to user request. The present invention recognizes that video segmentation program 122 utilizes one or a combination of: video processing, image processing, natural language processing, machine vision, etc. to analyze the video segments and associated with crowd-based comments. In various embodiments, video segmentation program 122 analyzes the one or more video segments and crowd-based comments and determines which video segments and associated crowd-based comments provide the most information relative to the user request, and which video segments and associated crowd-based comments provide the least information relative to the user request.

In various embodiments, video segmentation program 122 identifies one or more video segments based, at least, on the following, but is not limited to, (i) the content of the video segment, (ii) the feedback (i.e., positive and/or negative feedback) of the one or more crowd-based comments, (iii) the quantity of the one or more crowd-based comments. In various embodiments, video segmentation program 122 utilizes a feedforward neural network to determine a weighting factor associated with the feedback associated with a set of video segments. In some embodiments, video segmentation program 122 arranges the digital media data (e.g., (i) content of the video segment, (ii) the feedback of the one or more crowd-based comments, and (iii) the quantity of the one or more crowd-based comments into neurons in a layered feedforward topology network. In some embodiments, video segmentation program 122 monitors the neurons in the neural network, as each input connects to neurons between, at least, a first layer, one or more hidden layers, and a second layer. One having ordinary skill in the art would understand that the multilayer perception neural network arranges input data into a plurality of neurons in the first layer of the neutral network and arranges the output data of the first layer into the input of the second layer to create a fully connected neural network. Video segmentation program 122 receives output data with weights and thresholds describing the free parameters of the I/O data (e.g., I/O data included in the digital media data). One having ordinary skill in the art would understand that the weights and thresholds describing the free parameters of the I/O data represent the change in the variables from the input data to the output data of the neural network.

In various embodiments, video segmentation program 122 includes a convolutional neural network (CNN). Wherein the CNN consist of I/O data, as well as multiple hidden layers of neurons (i.e., RELU layer). Video segmentation program 122 analyzes the (i) the input data of the multiplayer perceptron neural network (MLP) and (ii) the change in the output variables, at least in part. In various embodiments, video segmentation program 122 analyzes the output data of the CNN, wherein the output data represents a scaled numeric variable based, at least, on (i) the input data and (ii) the weights assigned to each input data through the one or more layers of the CNN. The present invention recognizes that the output data is associated with one or more video segments. Video segmentation program 122 organizes the output data (i.e., one or more video segments) in a ranked list based, at least, on the scaled numeric variable. In various embodiments, the scaled numeric variable represents a ranked value that determines how relevant and/or similar the video segment is compared to various other video segments, in which the user request requests a video summary compiled of digital media data.

Video segmentation program 122 generates a video summary that includes, but is not limited to, (i) one or more ranked video segments, (ii) one or more crowd-based comments associated with the one or more video segments, and (iii) various summary data associated with the video segments (i.e., title of video files, length of video segments, URL links to original video files, etc.). In various embodiments, video segmentation program 122 generates the video summary by splicing the one or more video segments together to form on cohesive video. In various embodiments, video segmentation program 122 embeds one or more video direct accesses into the video summary associated, at least, with the one or more crowd-based comments to allow the user to skip to specific segments of the video summary. Additionally, video segmentation program 122 embeds hyperlinks of the URL links to the original video files within the video summary.

Figure 3:
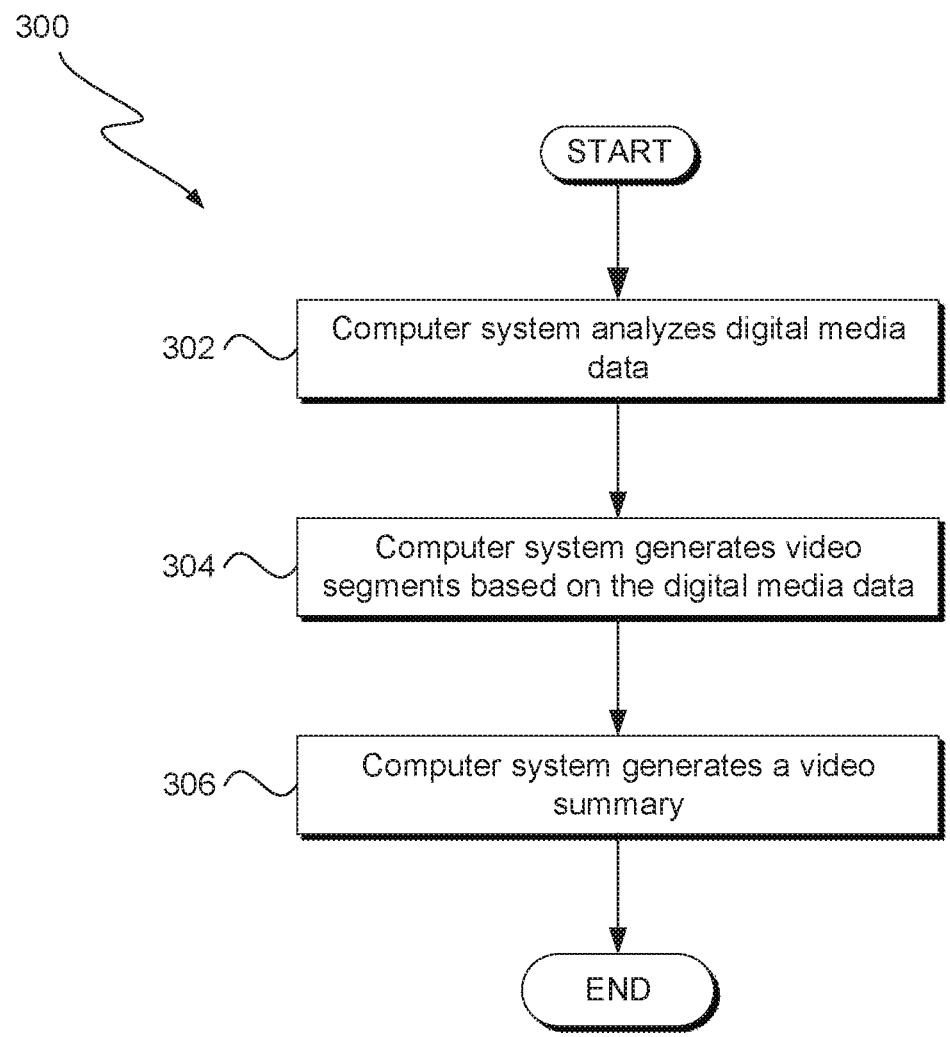
FIG. 3 illustrates operational processes of a system for executing a video summary, on a computing device within the environment of FIG. 1, in accordance with an exemplary embodiment of the present invention.

FIG. 3 depicts a flowchart depicting operations for executing a video summary system for computing environment 100, in accordance with an illustrative embodiment of the present invention. More specifically, FIG. 3, depicts combined overall operations, 300, of video segmentation program 122 (executing on computer system 120). In some embodiments, operations 300 represents logical operations of video segmentation program 122, wherein interactions between video segmentation program 122 of computer system 120, client application 132 of client device 130 and server application 142 of SAN 140 represents logical units executing on computer system 120. Further, operations 300 can include a portion or all of combined overall operations of 200. It should be appreciated that FIG. 3 provides an illustration of one implementation and does not imply any limitations with regard to environments in which different embodiments may be implemented. Many modifications to the depicted environment may be made. In one embodiment of flowchart 300, the series of operations, of flowchart 300, can be performed simultaneously. Additionally, the series of operations, in flowchart 300, can be terminated at any operation. In addition to the features previously mentioned, any operation, of flowchart 300, can be resumed at any time.

In operation 302, video segmentation program 122 analyzes digital media data. In various embodiments of the present invention, video segmentation program 122 identifies one or more videos which includes, but is not limited to, (i) one or more crowd-based comments and (ii) one or more direct video accesses. Video segmentation program 122 analyzes the videos and the one or more crowd-based comments. In some embodiments, video segmentation program 122 identifies one or more crowd-based comments that include content that provides substantive feedback (e.g., positive and/or negative feedback) regarding the video. Additionally, video segmentation program 122 analyzes the one or more crowd-based comments to determine if a video direct access is included with the crowd-based comments. In some embodiments, video segmentation program 122 determines that a video direct access exists, then video segmentation program 122 utilizes that video direct access to clip the video file, at least, starting from the point in which time is associated with the video direct access, as discussed above. One having ordinary skill in the art would understand that a video direct access directs a viewer of a video to a specific point in time during the duration of the video. In another embodiment, video segmentation program 122 analyzes the video utilizing one or a combination of: image processing, video processing, machine vision, cognitive AI processing, natural language processing, speech to text processing, etc., to determine which, if any, segments of the video provide substantive feedback regarding the content of the video. In various embodiments, video segmentation program 122 identifies that one or more segments of a video exist that provide substantive feedback regarding the content of the video.

In operation 304, video segmentation program 122 generates one or more video segments associated with the digital media data. In various embodiments, video segmentation program 122 generates one or more video segments based, at least in part, on the analyzation of the video itself. In these embodiments, the present invention recognizes that video segmentation program 122 analyzes the video in its entirety, and determines, at least, that one or more segments of the video reach a threshold value to provide information to the requestor. In these embodiments, video segmentation program 122 clips the video file, for at least, a determined period of time associated with the determination step. Video segmentation program 122 stores the one or more video segments on database 126. The present invention recognizes that there could be any number of videos that video segmentation program 122 analyzes and the present invention does not limit itself to a specific number.

In various embodiments, video segmentation program 122 analyzes one or more crowd-based comments that may include one or more video direct accesses. Video segmentation program 122 analyzes the one or more crowd-based comments, as discussed above, and determines whether the one or more crowd-based comments include substantive feedback (e/g/. positive and/or negative feedback) that would provide information to the requestor based, at least, on the user request. In some embodiments, the one or more crowd-based comments include one or more video direct accesses. Video segmentation program 122 analyzes the time stamp associated with the one or more video direct accesses and utilizes the one or more video direct accesses to analyze the portion of video that the one or more video direct accesses direct the viewer towards on the video. In various embodiments, video segmentation program 122 determines that (i) one or more crowd-based comments and/or (ii) the one or more video direct accesses contain substantive feedback and information that would be beneficial to the requestor based, at least, on the user request. Video segmentation program 122 clips the segment of the video that (i) the one or more crowd-based comments and/or (ii) the one or more video direct accesses direct the viewer towards on the video. The present invention recognizes that video segmentation program 122 clips one or more segments of one or more videos based, at least, on the content of the one or more crowd-based comments, and the various segments of the video that the one or more video direct accesses. Video segmentation program 122 stores the one or more video segments on database 126. In various embodiments, as recognized above, video segmentation program 122 assigns a threshold value (e.g., a rank) to the one or more video segments and arranges the one or more video segments in a descending order from a highest to lowest rank value.

In operation 306, video segmentation program 122 generates (i) the one or more video segments, (ii) the one or more crowd-based comments associated with the one or more video segments, and (iii) various video summary data associated with the video segments (i.e., title of video files, length of video segments, URL links to original video files, etc.). In various embodiments, video segmentation program 122 generates the video summary by splicing the one or more video segments together to form, at least, one cohesive video. In various embodiments, video segmentation program 122 embeds video direct access into the video summary associated, at least, with the one or more crowd comments to allow the user to skip to specific portions of the video summary. Additionally, video segmentation program 122 embeds hyperlinks of the URL links to the original video files within the video summary.

Figure 4:
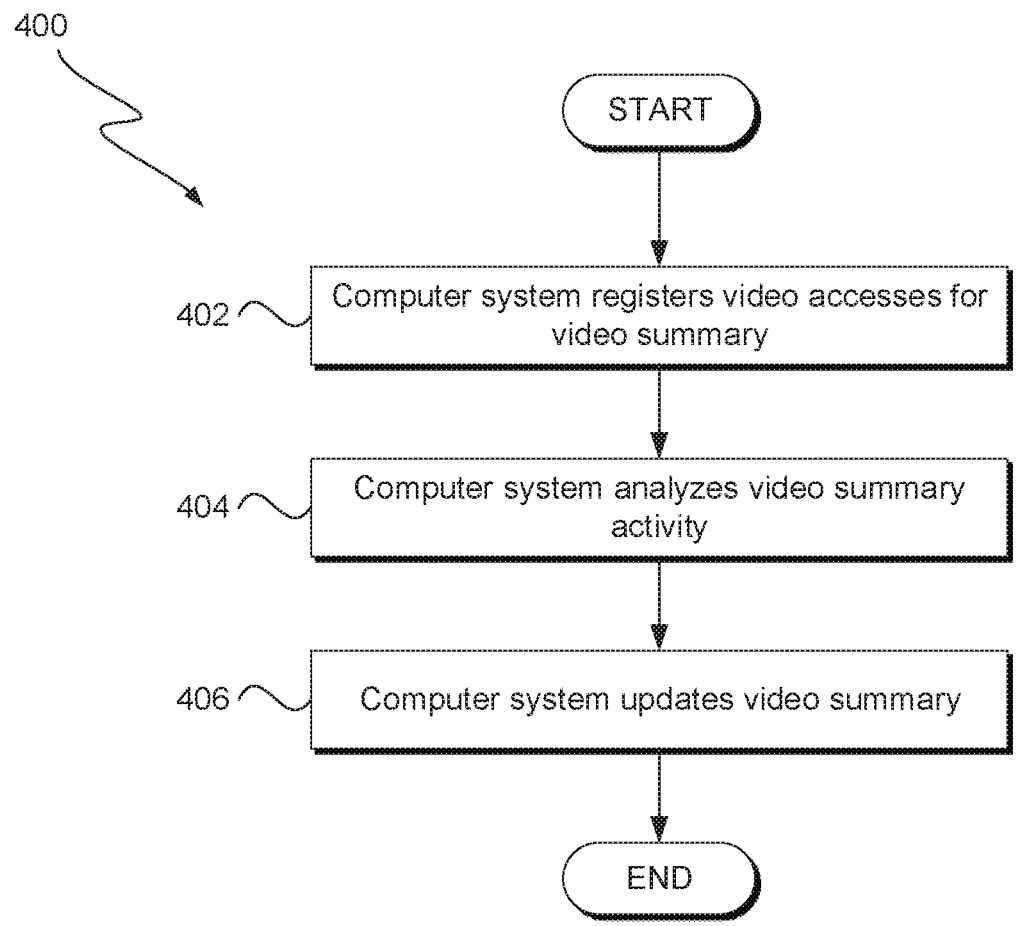
FIG. 4 illustrates operational processes of a system for executing a video summary, on a computing device within the environment of FIG. 1, in accordance with an exemplary embodiment of the present invention.

FIG. 4 depicts a flowchart depicting operations for executing an updated video summary for computing environment 100, in accordance with an illustrative embodiment of the present invention. More specifically, FIG. 4 depicts combined overall operations, 400, of video segmentation program 122 (executing on computer system 120). In some embodiments, operations 400 represents logical operations of video segmentation program 122, wherein interactions between video segmentation program 122 of computer system 120, client application 132 of client device 130, and server application of SAN 140 represents logical units executing on computer system 120. Further, operations 400 can include a portion or all of combined overall operations of 200 and operations of 300. It should be appreciated that FIG. 4 provides an illustration of one implementation and does not imply any limitations with regard to the environments in which different embodiments may be implemented. Many modifications to the depicted environment may be made. In one embodiment of flowchart 400, the series of operations can be performed in any order. In another embodiment, the series of operations, of flowchart 400, can be performed simultaneously. Additionally, the series of operations, in flowchart 400, can be terminated at any operation. In addition to the features previously mentioned, any operation, of flowchart 400, can be resumed at any time.

In operation 402, video segmentation program 122 registers user activity from, at least, client application 132. Video segmentation program 122 identifies which, if any, of the one or more video direct accesses associated with the, at least, one video summary has been accessed. Video segmentation program 122 records the quantity of times the one or more video direct accesses had been utilized by the viewer of the video summary.

In operation 404, video segmentation program 122 analyzes the video summary activity (e.g., user activity). In various embodiments, video segmentation program 122 identifies data including, but is not limited to, (i) the quantity of time viewed of each video segment, respectively, and (ii) the amount of embedded hyperlinks associated with the, at least, one video summary the user accessed. Additionally, video segmentation program 122 identifies the extent to which the viewer of the video summary engaged with the video summary. In various embodiments, video segmentation program 122 determines that if a viewer viewed the video summary for a threshold value of time, then the viewer found the information beneficia. Additionally, if the viewer accessed a threshold value of URL hyperlinks associated with the video summary, then the viewer found the information beneficial. In some embodiments, video segmentation program 122 determines that a viewer of the video summary did not find the information beneficial, if the viewer did not view the video summary for a threshold value of time and/or if the viewer did not access a threshold quantity of URL hyperlinks. The present invention recognizes that if a viewer views the video summary in full or for a threshold period of time and/or accesses a threshold quantity of URL hyperlinks it is representative that the viewer found the content and information contained within the video summary beneficial. In some embodiments, however, video segmentation program 122 determines that a viewer does not find the content and information beneficial if the viewer does not view the video summary for a threshold period of time and/or does not access a threshold quantity of URL hyperlinks. If video segmentation program 122 determines that the viewer did not find the content and information beneficial based, at least, on the threshold levels discussed above, then video segmentation program 122 updates the video summary.

In operation 406, video segmentation program 122 updates the video summary based, at least, on video segmentation program 122 determining that the viewer did not find the content and information contained within the video summary beneficial, as discussed above. In various embodiments, video segmentation program 122 determines that the, at least, one video summary needs to be updated, at least, in full or in-part. In various embodiments, video segmentation program 122 communicates with server application 142 and executes, at least, a second query on database 144 based, at least, on the user request for the one video summary. In various embodiments, the second query is executed in search of additional videos, crowd-based comments, and one or more video direct accesses (e.g., additional digital media data), wherein the second query is based, at least, on (i) the user request and (ii) the user activity associated with, at least, the one video summary. In some embodiments, video segmentation program 122 communicates a set of program instructions to server application 142 to retrieve additional digital media data and communicate the additional digital media to video segmentation program 122.

In various embodiments, video segmentation program 122 analyzes the additional digital media data and identifies (i) one or more crowd-based comments, (ii) one or more video direct accesses, and (iii) one or more video segments that is associated, at least in part, with the user request. Additionally, video segmentation program 122 identifies additional content related with the user request that is distinct from the content within the video summary that video segmentation program 122 identified that did not reach a threshold value, as discussed above. Video segmentation program 122 updates the video summary by removing the digital media data that did not reach a threshold value and replaces that content with the additional digital media data identified by video segmentation program 122. In various embodiments, video segmentation program 122 communicates the updated video summary to client device 130 for the requestor of client deice 130 to view. In some embodiments, video summary segmentation program 122 communicates the updated video summary to database 144 to be stored and accessed on the video-sharing website.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
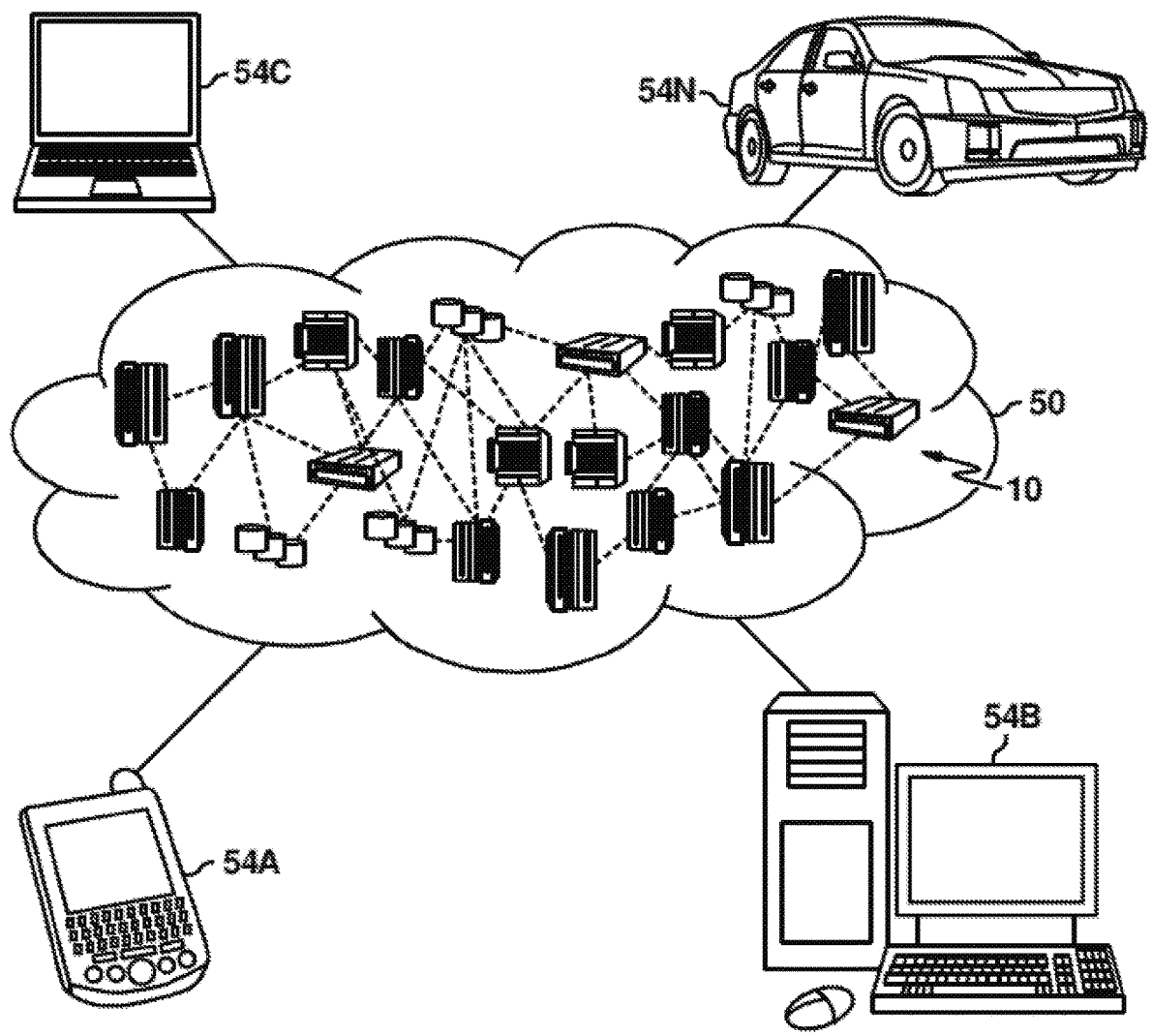
FIG. 5 depicts a cloud computing environment according to at least one embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
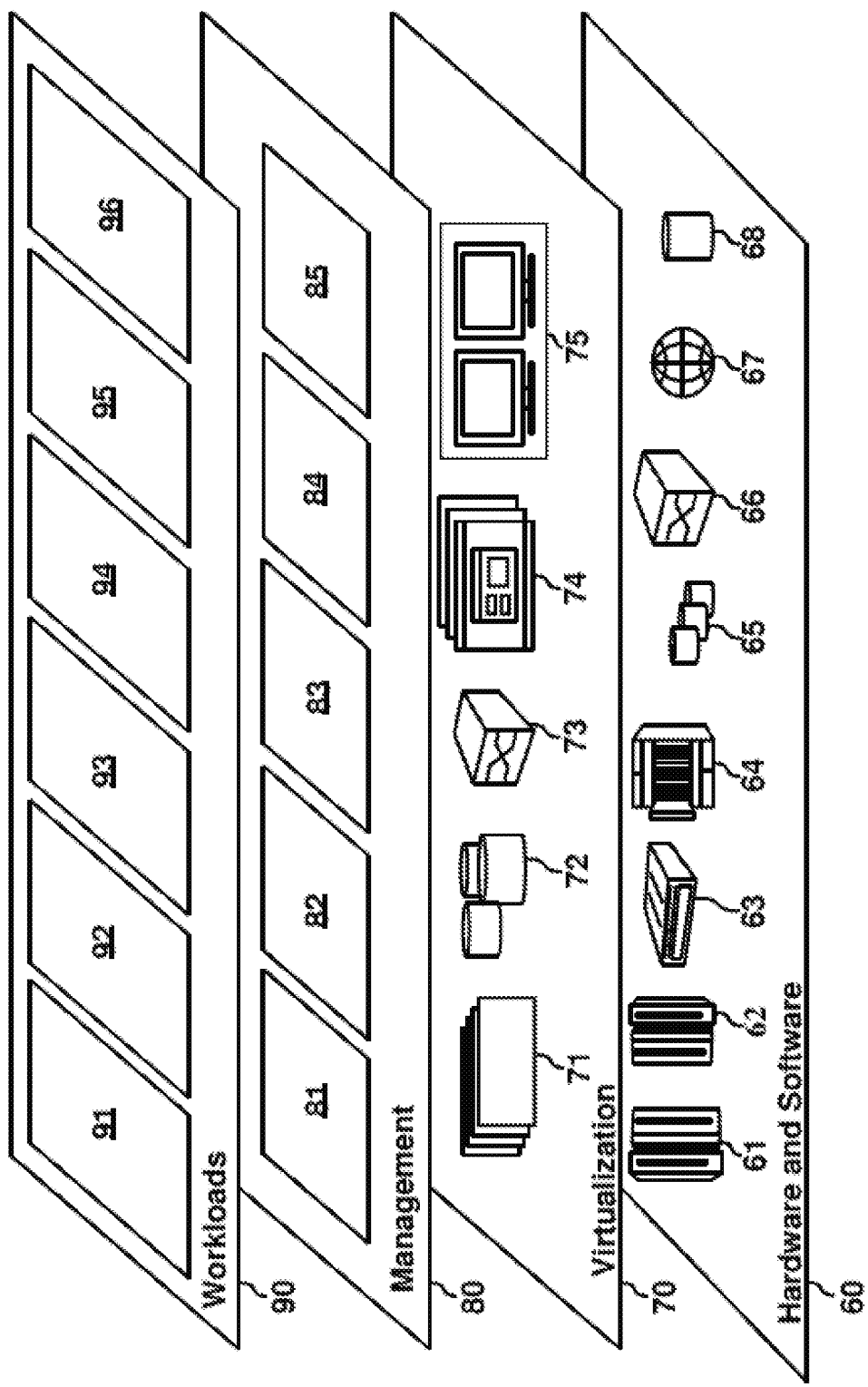
FIG. 6 depicts abstraction model layers according to at least one embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 7:
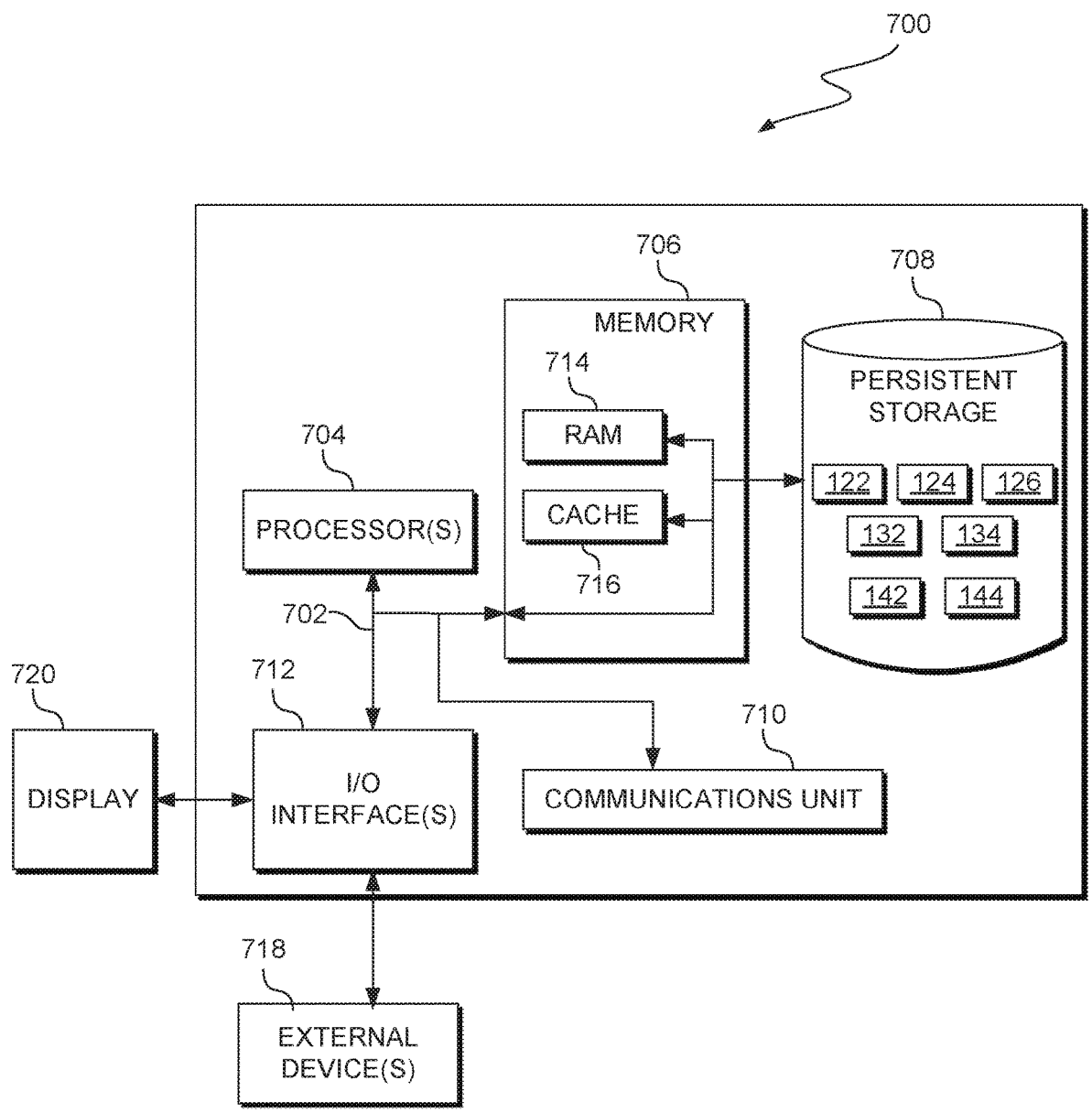
FIG. 7 depicts a block diagram of components of one or more computing devices within the computing environment depicted in FIG. 1, in accordance with an exemplary embodiment of the present invention.

FIG. 7 depicts a block diagram, 700, of components of computer system 120, client device 130, and SAN 140, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computer system 120, client device 130, and SAN 140 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Video segmentation program 122, video sharing application 124, database 126, client application 132, computer interface 134, server application 142, and database 144, are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 110. In these examples, communications unit 710 includes one or more network interface cards. Communications unit 710 may provide communications through the use of either or both physical and wireless communications links. Video segmentation program 122, video sharing application 124, database 126, client application 132, computer interface 134, server application 142, and database 144 may be downloaded to persistent storage X08 through communications unit X10.

I/O interface(s) 712 allows for input and output of data with other devices that may be connected to computer system 120, client device 130, and SAN 140. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., video segmentation program 122, video sharing application 124, database 126, client application 132, computer interface 134, server application 142, and database 144, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:
    analyzing, by one or more processors, one or more digital media data to produce an analysis, wherein the one or more digital media data includes a video and a crowd-based interaction associated with the video, wherein the crowd-based interaction includes a comment;
    generating, by one or more processors, one or more video segments for the video based on the one or more digital media data; and
    generating, by one or more processors, a video summary associated with the video based on a user request.

2. The computer-implemented method of claim 1, the method further comprising:
    receiving, by the one or more processors, a user request;
    executing, by the one or more processors, a query on a database based on the user request;
    identifying, by the one or more processors, one or more digital media data associated with the user request; and
    receiving, by the one or more processors, the one or more digital media data.

3. The computer-implemented method of claim 1, the method further comprising:
    analyzing, by the one or more processors, the one or more digital media data;
    identifying, by the one or more processors, data associated with the one or more digital media data that includes (i) one or more videos, (ii) one or more crowd-based comments, and (iii) one or more video direct accesses;
    generating, by the one or more processors, an analysis result by analyzing the one or more digital media data using one or a combination of (i) natural language processing, (ii) word2vec, (iii) cognitive AI processing, (iv) video processing, and (v) machine vision; and
    identifying, by the one or more processors, one or more user feedback associated with the one or more digital media data based on the analysis result.

4. The computer-implemented method of claim 1, the method further comprising:
    analyzing, by the one or more processors, one or more user feedback;
    identifying, by the one or more processors, that the one or more user feedback reaches a threshold value of similarity to the user request; and
    determining, by the one or more processors, that the one or more user feedback reaches a threshold value of similarity based on a result of a semantic analysis of (i) the user request and (ii) the one or more user feedback.

5. The computer-implemented method of claim 3, the method further comprising:
    generating, by the one or more processors, one or more video segments based on the user feedback associated with the one or more digital media data; and
    generating, by the one or more processors, an aggregate of the one or more video segments, wherein the aggregate includes a video summary direct access that is associated with a specific timestamp at which a given video segment begins.

6. The computer-implemented method of claim 5, the method further comprising:
    generating, by the one or more processors, the video summary which includes (i) the aggregate of the one or more video segments, and (ii) the one or more digital media data;
    generating, by the one or more processors, one or more labels for the video summary based on (i) an analysis of a crowd-based comment that points to a video segment and (ii) on one or a combination of wherein the one or more labels are generated based on one or a combination of words, hash representation, or n-gram structures; and
    generating, by the one or more processors, a ranking for the one or more video segments based on a calculated score of the content of the one or more crowd-based comments, wherein the given calculated score is based on a feedforward neural network used to determine a weighting factor associated with features associated with the one or more video segments.

7. The computer-implemented method of claim 5, the method further comprising:
    playing, by the one or more processors, the video summary for one or more users;
    receiving, by the one or more processors, a user activity associated with the one or more users;
    analyzing, by the one or more processors, the user activity; and
    updating, by the one or more processors, the one or more video segments associated with the video summary based on the view time of the one or more video segments.

8. The computer-implemented method of claim 1, the method further comprising:
    identifying, by the one or more processors, one or more crowd-based interactions associated with the one or more videos;
    generating an analysis result by analyzing, by the one or more processors, the one or more crowd-based interactions that include one or a combination of (i) crowd-based interaction with the one or more videos, (ii) one or more crowd-based comments associated with one or more segments of the one or more videos, or (iii) one or more crowd-based reactions associated with the one or more videos; and
    determining, by the one or more processors, the one or more video segments based on the analysis result.

9. A computer program, the computer program product comprising:
one or more computer-readable storage media and program instructions stored on the one or more computer-readable storage media, the program instructions comprising:
program instructions to analyze one or more digital media data to produce an analysis, wherein the one or more digital media data includes a video and a crowd-based interaction associated with the video, wherein the crowd-based interaction includes a comment;
program instructions to generate one or more video segments for the video based on the one or more digital media data; and
program instructions to generate a video summary associated with the video based on a user request.

10. The computer program product of claim 9, the program instructions further comprising:
program instructions to receive a user request;
program instructions to execute a query on a database based on the user request;
program instructions to identify one or more digital media data associated with the user request; and
program instructions to receive the one or more digital media data.

11. The computer program product of claim 9, the program instructions further comprising:
program instructions to analyze the one or more digital media data;
program instructions to identify data associated with the one or more digital media data that includes (i) one or more videos, (ii) one or more crowd-based comments, and (iii) one or more video direct accesses;
program instructions to generate an analysis result by analyzing the one or more digital media data using one or a combination of (i) natural language processing, (ii) word2vec, (iii) cognitive AI processing, (iv) video processing, and (v) machine vision; and
program instructions to identify one or more user feedback associated with the one or more digital media data based on the analysis result.

12. The computer program product of claim 9, the program instructions further comprising:
program instructions analyze one or more user feedback;
program instructions to identify that the one or more user feedback breaches a threshold value of similarity to the user request; and
program instructions to determine that the one or more user feedback reaches a threshold value of similarity based on a result of a semantic analysis of (i) the user request and (ii) the one or more user feedback.

13. The computer program product of claim 11, the program instructions further comprising:
program instructions to generate one or more video segments based on the user feedback associated with the one or more digital media data; and
program instructions to generate an aggregate of the one or more video segments, wherein the aggregate includes a video summary direct access that is associated with a specific timestamp at which a given video segment begins.

14. The computer program product of claim 9, the program instructions further comprising:
program instructions to generate the video summary which includes (i) the aggregate of the one or more video segments, and (ii) the one or more digital media data;
program instructions to generate one or more labels for the video summary based on (i) an analysis of a crowd-based comment that points to a video segment and (ii) on one or a combination of wherein the one or more labels are generated based on one or a combination of words, hash representation, or n-gram structures; and
program instructions to generate a ranking for the one or more video segments based on a calculated score of the content of the one or more crowd-based comments, wherein the given calculated score is based on a feedforward neural network used to determine a weighting factor associated with features associated with the one or more video segments.

15. The computer program product of claim 11, the program instructions further comprising:
program instructions to play the video summary for one or more users;
program instructions to receive a user activity associated with the one or more users;
program instructions to analyze the user activity; and
program instructions to update the one or more video segments associated with the video summary based on the view time of the one or more video segments.

16. The computer program product of claim 9, the program instructions further comprising:
program instructions to identify one or more crowd-based interactions associated with the one or more videos;
program instructions to generate by the one or more processors, the one or more crowd-based interactions that include one or a combination of (i) crowd-based interaction with the one or more videos, (ii) one or more crowd-based comments associated with one or more segments of the one or more videos, or (iii) one or more crowd-based reactions associated with the one or more videos; and
program instructions to determine the one or more video segments based on the analysis result.

17. A computer system, the computer system comprising:
one or more computer processors;
one or more computer readable storage medium; and
program instructions stored on the computer readable storage medium for execution by at least one of the one or more processors, the program instructions comprising:
program instructions to analyze one or more digital media data to produce an analysis, wherein the one or more digital media data includes a video and a crowd-based interaction associated with the video, wherein the crowd-based interaction includes a comment;
program instructions to generate one or more video segments for the video based on the one or more digital media data; and
program instructions to generate a video summary associated with the video based on a user request.

18. The computer system of claim 17, the program instructions further comprising:
program instructions to receive a user request;
program instructions to execute a query on a database based on the user request;
program instructions to identify one or more digital media data associated with the user request; and
program instructions to receive the one or more digital media data.

19. The computer system of claim 17, the program instructions further comprising:
- program instructions to analyze the one or more digital media data;
- program instructions to identify data associated with the one or more digital media data that includes (i) one or more videos, (ii) one or more crowd-based comments, and (iii) one or more video direct accesses;
- program instructions to generate an analysis result by analyzing the one or more digital media data using one or a combination of (i) natural language processing, (ii) word2vec, (iii) cognitive AI processing, (iv) video processing, and (v) machine vision; and
- program instructions to identify one or more user feedback associated with the one or more digital media data based on the analysis result.

20. The computer system of claim 17, the program instructions further comprising:
- program instructions analyze one or more user feedback;
- program instructions to identify that the one or more user feedback reaches a threshold value of similarity to the user request; and
- program instructions to determine that the one or more user feedback reaches a threshold value of similarity based on a result of a semantic analysis of (i) the user request and (ii) the one or more user feedback.

* * * * *